(12) United States Patent
Bourdon

(10) Patent No.: US 8,417,526 B2
(45) Date of Patent: Apr. 9, 2013

(54) SPEECH RECOGNITION LEARNING SYSTEM AND METHOD

(75) Inventor: Francois Bourdon, Verchères (CA)

(73) Assignee: Adacel, Inc., Quebec (CA)

(*) Notice: Subject to any disclaimer, the term of this patent is extended or adjusted under 35 U.S.C. 154(b) by 971 days.

(21) Appl. No.: 12/403,804

(22) Filed: Mar. 13, 2009

(65) Prior Publication Data

US 2010/0235167 A1 Sep. 16, 2010

(51) Int. Cl.
*G10L 15/06* (2006.01)
*G10L 15/00* (2006.01)

(52) U.S. Cl. .................................. 704/252; 704/251

(58) Field of Classification Search .................. None
See application file for complete search history.

(56) References Cited

U.S. PATENT DOCUMENTS

| | | | |
|---|---|---|---|
| 6,526,380 B1 | 2/2003 | Thelen | |
| 6,671,669 B1 | 12/2003 | Garudadri | |
| 6,801,890 B1 * | 10/2004 | Kauschke et al. | 704/243 |
| 6,836,758 B2 | 12/2004 | Bi | |
| 7,228,275 B1 | 6/2007 | Endo | |
| 7,509,259 B2 * | 3/2009 | Song | 704/256.2 |
| 7,617,103 B2 * | 11/2009 | He et al. | 704/256 |
| 7,813,926 B2 * | 10/2010 | Wang et al. | 704/245 |
| 7,941,189 B2 * | 5/2011 | Miyauchi | 455/569.2 |
| 7,996,220 B2 * | 8/2011 | Rose et al. | 704/244 |
| 2006/0184360 A1 | 8/2006 | Murveit | |
| 2008/0082334 A1 | 4/2008 | Watson | |

* cited by examiner

*Primary Examiner* — Talivaldis Ivars Smits
(74) *Attorney, Agent, or Firm* — Allen, Dyer, Doppelt, Milbrath & Gilchrist, P.A.

(57) ABSTRACT

One or more embodiments include a speech recognition learning system for improved speech recognition. The learning system may include a speech optimizing system. The optimizing system may receive a first stimulus data package including spoken utterances having at least one phoneme, and contextual information. A number of result data packages may be retrieved which include stored spoken utterances and contextual information. A determination may be made as to whether the first stimulus data package requires improvement. A second stimulus data package may be generated based on the determination. A number of speech recognition implementation rules for implementing the second stimulus data package may be received. The rules may be associated with the contextual information. A determination may be made as to whether the second stimulus data package requires further improvement. Based on the determination, one or more additional speech recognition implementation rules for improved speech recognition may be generated.

25 Claims, 3 Drawing Sheets

SPEECH RECOGNITION LEARNING SYSTEM AND METHOD

BACKGROUND

1. Technical Field

In one or more embodiments, a system and method for speech recognition is presented. More particularly, the one or more embodiments relate to a speech recognition learning system and method.

2. Background

A typical speech recognition system includes a single automatic speech recognition (ASR) engine to perform the recognition of an utterance. Speech Recognition systems generally rely on statistical principles to recognize speech accurately. Speech recognition events do not occur in a vacuum or in perfect scenarios. Recognition of speech can be influenced by numerous factors such as the environment in which the utterances was spoken and characteristics of a speaker's voice such as inflection or accent. Consequently, many ASR systems will not produce deterministic and equivalent results during a speech recognition event. For example, one ASR system may recognize one utterance better than another given a certain context. There are various examples of speech recognition implementations known in the art: U.S. Pat. Nos. 7,228,275, 6,526,380, 6,836,758, 6,671,669.

While the prior art system have been beneficial for their purposes, what is still needed is a speech recognition system that accounts for spoken utterances uttered in different contexts according to the environment in which it is spoken.

SUMMARY

One aspect includes a speech recognition learning system for improved speech recognition. The speech recognition learning system may include a speech optimizing system. The speech optimizing system may be configured to receive a first stimulus data package using, for example, a stimulus data package receiver, including one or more spoken utterances comprising at least one phoneme transmitted from a speech receiving device and contextual information relating to a state in which the one or more utterances is spoken. The speech optimizing system may be further configured to retrieve a number of result data packages using, for example, a result data package retriever. The result data packages may include a number of stored spoken utterances and stored contextual information associated with the stored spoken utterances relating to a state in which the utterance was spoken. A determination may be made (by, for example, a stimulus data package generator) as to whether the first stimulus data package at least partially requires improvement based on at least one of the result data packages. A second stimulus data package may be generated based on the determination of whether the first stimulus data package at least partially requires improvement.

In one embodiment, there may be a stimulus data package generator for determining whether the first stimulus data package at least partially requires improvement based on at least one of the result data packages and an additional stimulus data package generator for generating a second stimulus data package based on the determination of whether the first stimulus data package at least partially requires improvement.

In one embodiment, the stimulus data package generator may further include a contextual information generator and a stimulus generator.

The speech optimizing system may be further configured to receive a number speech recognition implementation rules for implementing the second stimulus data package. The speech recognition implementation rules may be received by a speech improvement processor. The speech recognition implementation rules may be associated with the contextual information. A determination may be made (by, for example, the speech improvement processor) as to whether the second stimulus data package at least partially requires further improvement based at least in part on one or more speech recognition implementation rules. The speech recognition implementation rules may be based on the contextual information of the second stimulus data package. Based on the determination, one or more second speech recognition implementation rules for providing improved speech recognition may be generated.

In one embodiment, there may be speech improvement processor for receiving a number of speech recognition implementation rules for implementing the second stimulus data package. There may be an additional speech improvement processor for determining whether the second stimulus data package at least partially requires further improvement based at least in part on one or more speech recognition implementation rules.

In one embodiment, the system is further configured to perform iteratively if the determination does not produce an improved second stimulus data package.

The speech recognition learning system may further include a live speech recognition system in communication with the speech optimizing system. The live speech recognition system may be configured to receive one or more spoken utterances uttered within range of a speech receiving device and contextual information relating to a state in which the one or more utterances is spoken. The live speech recognition system may be further configured to receive a number of live speech recognition implementation rules. Based on at least one of the live speech recognition implementation rules, speech for recognition by a voice activated device capable of recognizing outputted speech may be outputted. At least one of the live speech recognition implementation rules may be based on the contextual information associated with the one or more spoken utterances.

The live speech recognition system may include a receiver for receiving one or more spoken utterances, a receiver for receiving a number of live speech recognition implementation rules, a processor for processing the one or more spoken utterances and context information, and a transmitter for outputting one or more processed spoken utterances.

The speech optimizing system may be further configured to generate and receive one or more second result data packages. The one or more second result data package may include at least one speech recognition implementation rule and may be received by one or more knowledge databases. The one or more knowledge databases may include a number of stored result data packages. The speech optimizing system may be further configured to select at least one speech recognition implementation rule from the result data package for providing improved speech recognition.

The speech recognition implementation rule may be selected (by, for example, a knowledge prospector) based upon a pattern between at least two stored result data packages in the knowledge databases. The selected speech recognition implementation rule may be transmitted to optimize the speech recognition implementation rule for improved speech recognition. Optimized speech recognition implementation rules may be generated. In one embodiment, the speech optimizing system may be further configured to perform these functions iteratively.

In one embodiment, based on the determination, the system is further configured to generate one or more hypotheses and the one or more second result data packages generated are based on the one or more hypotheses.

In one embodiment, the speech optimizing system may further include a baseline handler for generating a number of initial speech recognition implementation rules. The initial speech recognition implementation rule may be used, at least in part, in determining whether the second stimulus data package requires further improvement.

Another aspect may include a speech recognition learning system for improved speech recognition having a means for receiving a first stimulus data package including one or more spoken utterances comprising at least one phoneme transmitted from a speech receiving device and contextual information relating to a state in which the one or more utterances is spoken. The system may further include a means for retrieving a number of result data packages. The result data packages may include a number of stored spoken utterances and stored contextual information associated with the stored spoken utterances relating to a state in which the utterance was spoken. The system may further include a means for determining whether the first stimulus data package at least partially requires improvement based on at least one of the result data packages. The system may further include a means for generating a second stimulus data package based on the determination of whether the first stimulus data package at least partially requires improvement.

The system may further include a means for receiving a number of speech recognition implementation rules for implementing the second stimulus data package. The speech recognition implementation rules may be associated with the contextual information. The system may further include a means for determining whether the second stimulus data package at least partially requires further improvement based at least in part on one or more speech recognition implementation rules. The speech recognition implementation rules may be based on the contextual information of the second stimulus data package. Based on the determination, one or more additional speech recognition implementation rules for improved speech recognition may be generated.

In one embodiment the system may further include a means for performing the functions iteratively if an improved second stimulus data package is not produced.

The system may further include a means for receiving one or more spoken utterances uttered within range of a speech receiving device and contextual information relating to a state in which the one or more utterances is spoken. The system may further include a means for receiving a number of live speech recognition implementation rules. Based on at least one of the live speech recognition implementation rules, speech for recognition by a voice activated device capable of recognizing outputted speech may be outputted. At least one of the livespeech recognition implementation rules may be based on the contextual information associated with the one or more spoken utterances.

The system may further include a means for generating and receiving one or more second result data packages. The one or more second result data package may include at least one speech recognition implementation rule and may be received by one or more knowledge databases. The one or more knowledge databases may include a number of stored result data packages. The system may further include a means for selecting at least one first speech recognition implementation rule from the second result data package for providing improved speech recognition.

The at least one first speech recognition implementation rule may be selected based upon a pattern between at least two stored result data packages in the knowledge databases. The system may further include a means for transmitting the selected first speech recognition implementation rule to optimize the speech recognition implementation rule for improved speech recognition. A means for generating one or more speech recognition implementation rules that are optimized for use during a speech recognition event may be included. In one embodiment, the system may further include a means for performing these functions iteratively.

In one embodiment, the system may further include a means for generating one or more hypotheses and the one or more second result data packages generated are based on the one or more hypotheses.

Another aspect may include a computer-implemented speech recognition learning method for improved speech recognition. The method include transmitting one or more utterances comprising at least one phoneme at a speech receiving device. The method may further include receiving a first stimulus data package including one or more spoken utterances comprising at least one phoneme transmitted from a speech receiving device and contextual information relating to a state in which the one or more utterances is spoken. The method may further include retrieving a number of result data packages. The result data packages may include a number of stored spoken utterances and stored contextual information associated with the stored spoken utterances relating to a state in which the utterance was spoken. The method may further include determining whether the first stimulus data package at least partially requires improvement based on at least one of the result data packages. The method may further include generating a second stimulus data package based on the determination of whether the first stimulus data package at least partially requires improvement.

The method may further include receiving a number of speech recognition implementation rules for implementing the second stimulus data package. The speech recognition implementation rules may be associated with the contextual information. The method may further include determining whether the second stimulus data package at least partially requires further improvement based at least in part on one or more speech recognition implementation rules. The speech recognition implementation rules may be based on the contextual information of the second stimulus data package. Based on the determination, one or more second speech recognition implementation rules for improved speech recognition may be generated.

In one embodiment the method may further include performing the functions iteratively if an improved second stimulus data package is not produced.

The method may further include receiving one or more spoken utterances uttered within range of a speech receiving device and contextual information relating to a state in which the one or more utterances is spoken. The method may further include receiving a number of live speech recognition implementation rules. Based on at least one of the live speech recognition implementation rules, speech for recognition by a voice activated device capable of recognizing outputted speech may be outputted. At least one of the live speech recognition implementation rules may be based on the contextual information associated with the one or more spoken utterances.

The method may further include generating and receiving one or more second result data packages. The one or more second result data package may include at least one first speech recognition implementation rule and may be received by one or more knowledge databases. The one or more knowledge databases may include a number of stored result data packages.

The method may further include selecting at least one first speech recognition implementation rule from the second result data package for providing improved speech recognition. The at least one first speech recognition implementation rule may be selected based upon a pattern between at least two of a plurality of stored result data packages in the one or more knowledge databases. The method may further include transmitting the selected first speech recognition implementation rule to optimize the first speech recognition implementation rule for improved speech recognition. One or more optimized speech recognition implementation rules for use during a speech recognition event may be generated. In one embodiment, the method may further include performing these functions iteratively.

In one embodiment, the method may further include generating one or more hypotheses and the one or more second result data packages generated are based on the one or more hypotheses.

These and other aspects of the present invention will be better understood in view of the attached drawings and following detailed description of the invention.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings, which:

DETAILED DESCRIPTION OF THE VARIOUS EMBODIMENTS

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Speech recognition has uses in many industries. Speech recognition is used in, for example, customer service, operating peripherals in a vehicle such as GPS systems and media players, and transmitting commands for airplane operation. Regardless of what purpose a speech recognition system is used, a speech recognition system should recognize speech accurately and efficiently particularly when it relates to the safety of an operator of a vehicle such as an airplane. Accordingly, users of speech recognition system can benefit from a speech recognition system that improves how speech is recognized and outputted to a voice activated device by using previous speech recognition events to accurately recognize future spoken utterances. For example, some non-limiting advantages that can be achieved include optimal recognition accuracy, false positive recognition rejection, increased recognition response time, supported phraseology scope, speaker independence, and noise independence.

In one or more embodiments, the present invention is directed to a speech recognition learning system and method. While the various embodiments are presented in the context of speech recognition in air-based vehicles such as airplane or jets, such embodiments may also be useful for speech recognition in other technologies. Non-limiting examples includes handheld computerized devices such as a GPS, an industrial process control system, or automotive vehicles.

Figure 1:
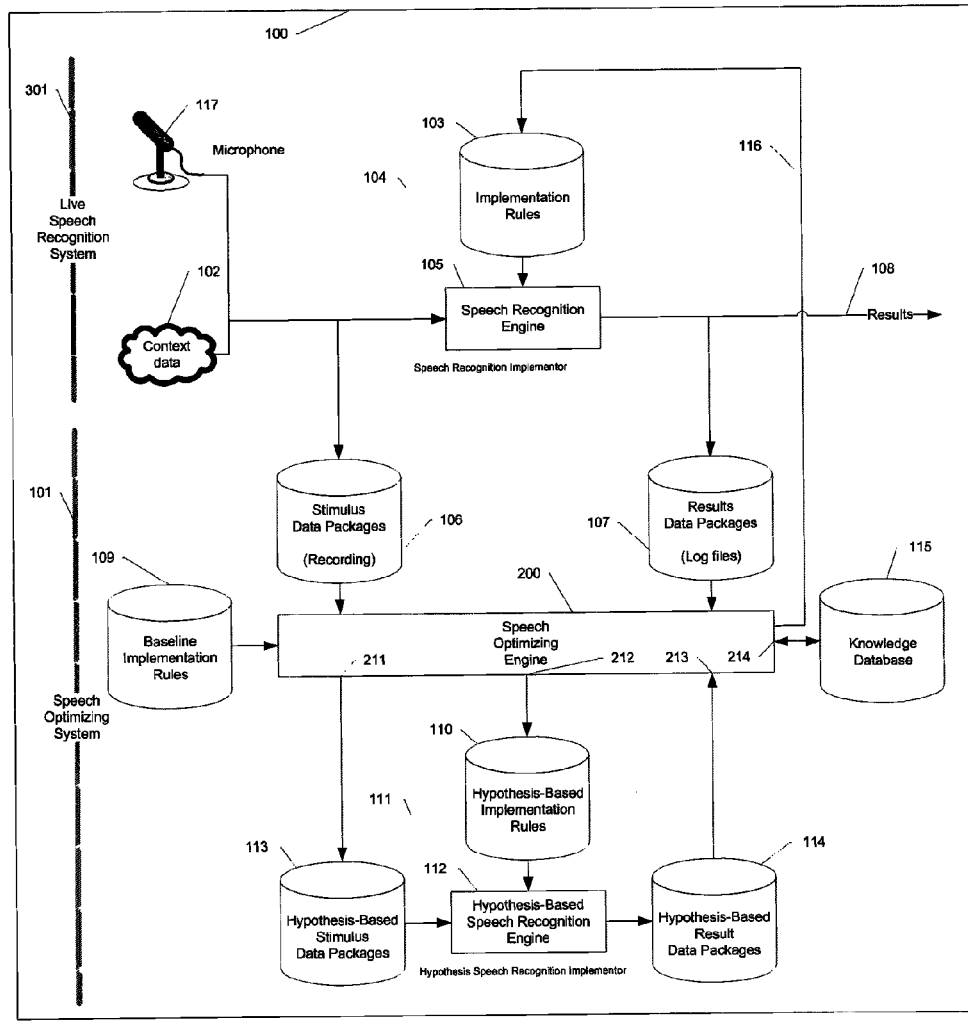
FIG. 1 illustrates a speech recognition learning system and the operation of the speech recognition learning system according to one or more embodiments.
Figure 3:
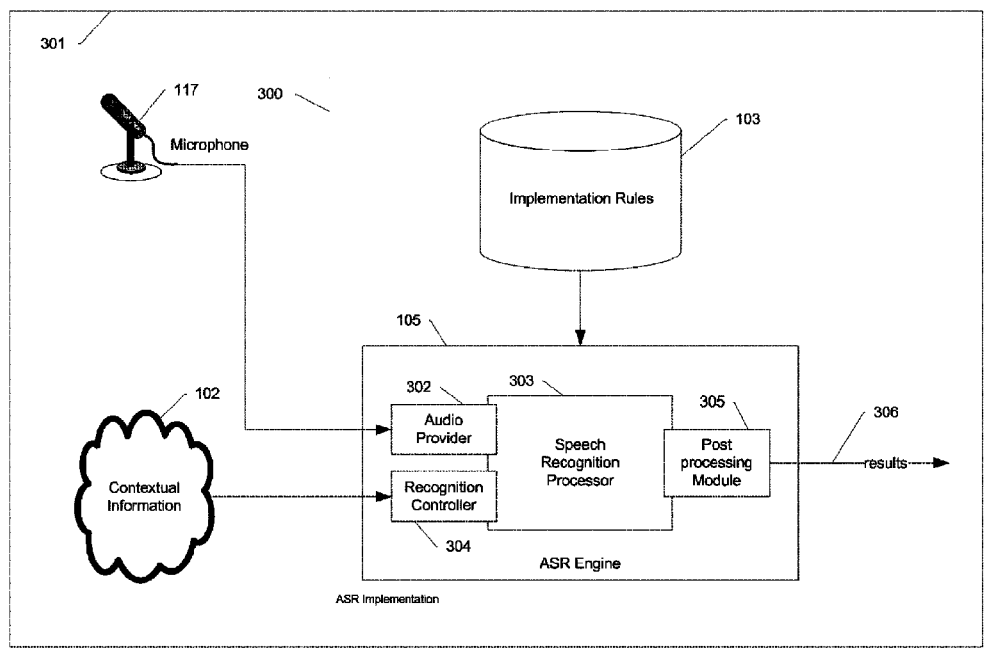
FIG. 3 illustrates a live speech recognition system and the operation of the live speech recognition system according to one or more embodiments.

FIG. 1 illustrates a configuration of a speech recognition learning system 100 according to one of the various embodiments of the present invention. The speech recognition learning system 100 includes a speech optimizing system 101 and, in one embodiment, may also include a live speech recognition system 301 (FIG. 3). The speech optimizing system and live speech recognition system may be housed in one terminal. Alternatively or in addition, the speech optimizing system and live speech recognition system may include a plurality of computers in communication with each other. It should be understood that the speech optimizing system and the live speech recognition system may communicate through network communication or any other non-limiting communication means known in the art for transferring data.

As represented in FIG. 1, the speech optimizing system 101 may include one or more subsystems or programs (hereinafter referred to as an "engine") in communication with each other for achieving one or more benefits of the speech optimizing system. A speech optimizing engine 200 may receive, process and output a plurality of data for optimizing speech for recognition by a voice activated device. Non-limiting example of the data may include stimulus data (e.g. spoken utterance and context information), recorded result data (e.g. processed stimulus data) and one or more speech recognition implementation rules. Non-limiting examples of implementation rules may include acoustic models (e.g., American English, British English, Canadian English, etc), language models (e.g., French, English, Spanish, etc), phonetic dictionaries, grammars (e.g., phraseology), natural language rules (e.g., semantics), speech recognition engine tuning parameters (e.g., confidence threshold, pruning thresholds, etc.), configuration of the audio provider, rules associated with the recognition controller, and rules associated with post processing (e.g., word confidence, error handling, etc). Furthermore, non-limiting examples of contextual information may include a push-to-talk (PTT) state, time stamp, ambient noise, engine RPM, G-Force, flight phase, vehicle speed, vehicle mode (e.g., ventilation, fan level, etc), vehicle state (e.g., aircraft flap configuration), communication channel state, and a personality module.

The speech optimizing engine 200 may be in communication with a hypothesis speech recognition implementor 111 though connections 211, 213 (e.g., network or electrical communication). Hypothesis speech recognition implementor 111 may be computer software stored in a terminal (not shown) located in the vehicle (e.g., an airplane) or at a ground station (i.e., base station). The hypothesis-based speech recognition implementor 111 may further include a hypothesis-based speech recognition engine 112. In one embodiment, as will be further described below, the speech optimizing engine 200 and the hypothesis speech recognition implementor 111 operate in a loop.

The speech optimizing engine 200 may also be in communication with a knowledge database 115 through connection 214. In one embodiment, there may also be a live speech recognition system 301 which may be in communication with the speech optimizing system 101 through connection 116. It should be understood that connection 116 may be any connection for data communication such as network communication. The live speech recognition system 301 may include a receiver 104 (i.e., a speech recognition implementor) for receiving one or more spoken utterances transmitted from a speech receiving device 117 such as a microphone. The receiver 104 may be in communication with a live speech recognition engine 105. In one embodiment, the receiver 104 is the live speech recognition engine. Further details of the live speech recognition system 301 will be described below with respect to FIG. 3.

Figure 2:
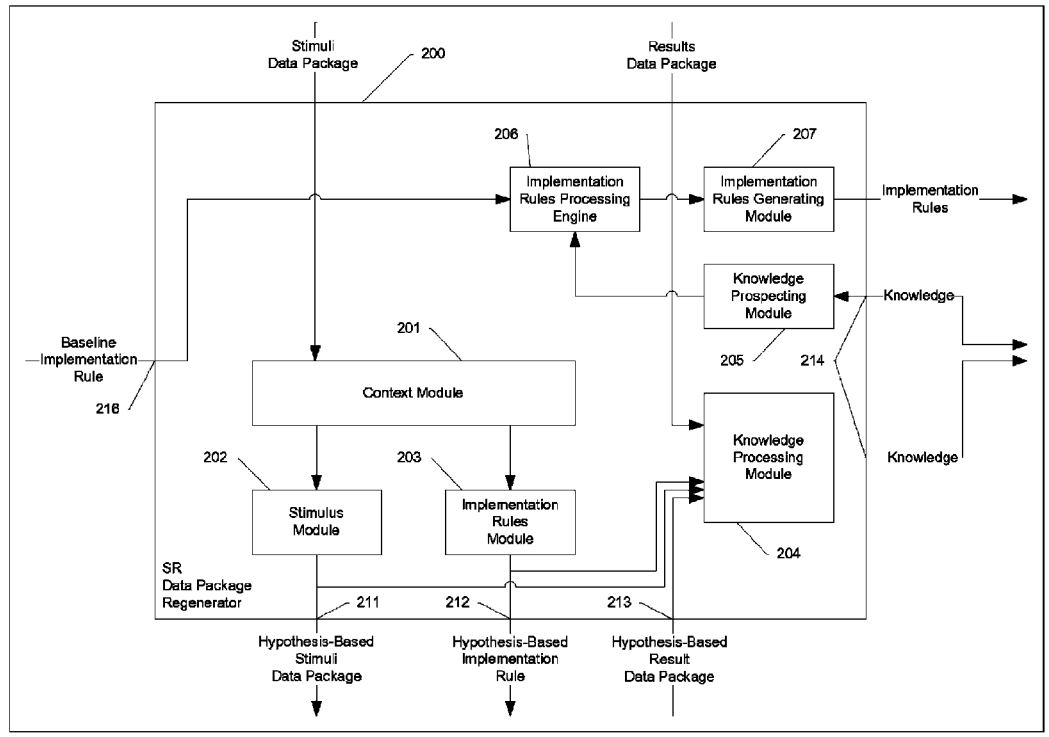
FIG. 2 illustrates a speech optimizing engine according to one or more embodiments.

FIG. 2 illustrates the structure and operation of the speech optimizing engine 200 according to one of the various embodiments. The speech optimizing engine 200 may include a number of further engines. The speech optimizing engine 200 may include a stimulus data package receiver also referred to as context module 201. The context module 201 may receive one or more recorded stimulus data packages recorded from the live speech recognition system 301. The context module 201 may include context data for generating a number of hypotheses used in association with the spoken utterance and the context information (i.e., the stimulus). In one embodiment, a hypothesis may be manipulations to and variations of the context information associated with a spoken utterance.

The speech optimizing engine, through the context module 201, may generate one or more variations to the context information (i.e., hypotheses) associated with a spoken utterance to recreate variations of one or more live spoken utterances. These variations to the context information may generate a hypothesis-based stimulus by stimuli module 202. The hypothesis-based stimuli may be used to test the comprehensibility of the one or more hypothesis-based stimulus for recognition at a voice activated device (not shown). Stimuli module 202 may include an algorithm or programming code for receiving the hypothesis and outputting one or more new or updated stimulus data packages based on the hypothesis.

The context module 201 may also be in communication with an implementation rules module 203. The implementation rules module 203 may include an algorithm or programming code for receiving the one or more hypotheses and selecting one or more implementation rules for implementing the one or more hypotheses. The one or more implementation rules may be based on the context information. The one or more implementation rules may be referred to as hypothesis-based implementation rules.

The operation of the speech optimizing system 101 will now be described with respect to FIG. 1. As illustrated in FIG. 1, a recorded stimulus data package 106 may be received by context module 201. The stimulus data package 106 may be received as one or more data packets. In one embodiment, the stimulus data package 106 may be stored in a stimulus package database. The context module 201 may then associate context information with the recorded stimulus data package 106 which may be inputted to stimuli module 202. Stimuli module 202 may then output one or more hypothesis-based stimuli using algorithms (programming code) stored in stimuli module 202. The hypothesis-based stimuli may be stored in a database 113.

The context module 201 may also generate an association between context information and one or more implementation rules. This association may be inputted to implementation rules module 203 to generate hypothesis-based implementation rules. The hypothesis-based implementation rules may be stored in a database 110. The hypothesis-based implementation rules may then be received by the hypothesis-based speech recognition engine 112 of the hypothesis-based speech recognition implementor 111.

In one embodiment, the context information (i.e., the hypotheses) may be programmed (i.e., hard coded) to the context module 201. In another embodiment, the context information may be stored in a database (not shown). Context module 201 may be in communication with the database for retrieving context information to associate with the recorded stimulus data package and/or implementation rules. The database may be automatically or manually updated regularly with context information.

The hypothesis speech recognition engine 112 may receive one or more hypothesis-based stimulus data packages. Using the one or more hypothesis-based stimulus data packages and the plurality of hypothesis-based implementation rules as inputs, the hypothesis-based speech recognition engine 112 may include an algorithm for generating one or more hypothesis-based result data packages. The hypothesis-based result data packages may be stored in a database 114. In one embodiment, the hypothesis-based speech recognition engine 112 may be in communication with an additional module (e.g., a result data package generator (not shown)) for generating a hypothesis-based result data package. The result data package generator may or may not be included in the hypothesis speech recognition implementor 111.

The hypothesis-based speech recognition engine 112 may be a sub-engine of the hypothesis speech recognition implementor 111 or a separate engine in communication with the speech optimizing engine. In one embodiment, the hypothesis-based speech recognition engine 112 is the hypothesis speech recognition implementor. The hypothesis-based speech recognition engine 112 may be in communication with the speech optimizing engine 200 for receiving, for example, the hypothesis-based data from the speech optimizing engine 200. The hypothesis-based speech recognition engine 112 may include an algorithm or computer readable instructions for receiving the hypothesis-based stimulus data packages and the hypothesis-based implementation rules data package received from the speech optimizing engine 200 to output one or more hypothesis-based result data packages. The one or more hypothesis-based result data packages may be one or more recreated variations of the live spoken utterance for building knowledge as to improved speech recognition. In one embodiment, the hypothesis-based data packages may be processed in the hypothesis speech recognition implementor 111 according to the manner in which a live spoken utterance is processed in the speech recognition implementor 104 as described with respect to FIG. 3. In one embodiment, the processing of the hypothesis-based data packages may occur iteratively until an optimal data package for improved speech recognition is produced.

With respect to FIG. 2, the hypothesis-based result data packages may be received by the speech optimizing engine 200 from the hypothesis-based speech recognition engine 112 and inputted to and received by a knowledge processing module 204. In one embodiment, the speech optimizing engine 200 may receive the hypothesis-bases result data packages from a result data package database 114. The knowledge processing module 204 may include computer programmed instructions for dissecting from the hypothesis-based result data packages the hypothesis-based implementation rules associated with the hypothesis-based result data package. The knowledge processing module 204 may receive one or more hypothesis-based result data packages and establish differences between and generate statistics of the one or more hypothesis-based result data packages using code programmed to the knowledge processing module 204. For example, knowledge processing module 204 may score (e.g., by assigning confidence levels) the hypothesis-based result data packages according to level of improved speech recognition. The differences and statistics may determine which hypothesis-based implementation rules were used to generate the one or more hypothesis-based result data packages. These dissected hypothesis-based implementation rules may then be stored in the knowledge database 115 via communication link 214. Communication link 214 may be wired or wireless. The hypothesis-based implementation rules may be stored with associated spoken utterances and context information.

The speech optimizing engine 200 may further include a knowledge prospecting module 205 in communication with knowledge database 115 through communication link 214. The knowledge prospecting module 205 may use the information stored by the knowledge processing module 204 for retrieving new knowledge for use when a spoken utterance is transmitted to a speech recognition device. The knowledge prospecting module 205 may detect correlations and patterns between the hypothesis-based implementation rules, the spoken utterances, and the context information stored in the knowledge database 115 for retrieving one or more optimal implementation rules. The one or more optimal implementation rules may be updated and stored via connection 116 in implementation rules database 103 for future retrieval at a speech recognition event. Connection 116 may be any connection known in the art capable of transmitting data.

In one embodiment, the speech optimizing engine 200 may further include an implementation rules processing engine 206. The implementation rules processing engine 206 may be in communication with the knowledge prospecting module 205. The implementation rules processing engine 206 may issue one or more optimal implementation rules. The knowledge prospecting module 205 may input data retrieved from the knowledge database 115 (e.g., hypothesis-based implementation rules, spoken utterances, hypothesis-based result data packages, and context information) to the implementation rules processing engine 206 for providing new knowledge (e.g., speech recognition improvement for a specific user if using a different language model) to be inputted to a implementation rule generating module 207. The one or more selected implementation rules may be inputted to an implementation rule generating module 207 for generating an implementation rule to be used at a future speech recognition event. It should be understood that knowledge may be referred to as correlations and patterns in the recreations of a live spoken utterance.

In one embodiment, the speech optimizing engine may also include a baseline implementation rules database 216. The baseline implementation rules database 216 may include a number of templates for generating initial and new implementation rules for use in a speech recognition event. In one embodiment, when the knowledge prospector retrieves a correlation or pattern from knowledge database 115, the correlation or pattern may be inputted to an implementation rules processing engine 206. The implementation rules processing engine 206 may optimize the baseline implementation rule and output the implementation rule to an implementation rule generating module 207.

If implementation rule processing engine 206 does not receive knowledge (i.e., correlations and patterns) for one specific implementation rule, a baseline implementation rule may be retrieved by the implementation rule processing engine 206 from the baseline implementation rule database 216. In one embodiment, using the baseline implementation rule, a new implementation rule may be inputted to the implementation rules processing engine 206. The implementation rules processing engine 206 may optimize the implementation rule for recognition at a speech recognition event. The optimized implementation rule may be inputted to the implementation rule generating module 207 for generating an implementation rule to be used at a future speech recognition event. The implementation rule may be stored in implementation rule database 103.

FIG. 3 illustrates a live speech recognition system 301 according to one of the various embodiment of the present invention. As used in one or more embodiments herein, the term "live" may refer to an event occurring in real-time. The live speech recognition system 301 may be in communication with the speech optimizing system 101 (FIG. 1) for providing improved speech recognition. The live speech recognition system 301 may include a speech recognition engine 105 (FIG. 1) for receiving one or more spoken utterances and contextual information associated with the one or more spoken utterances. The spoken utterances may be transmitted from a speech receiving device such as microphone 117. The speech recognition engine 105 may also receive a plurality of implementation rules for recognizing the spoken utterance based on the contextual information. The implementation rules may be received from an implementation rules database 103. The speech recognition engine 105 may then process the spoken utterances and contextual information using implementation rules for recognition by a voice activated device capable of recognizing the outputted speech. The processed information may be referred to as a "result." The result may be transmitted to a voice activate device through communication link 108.

The speech recognition engine 105 may also include an audio provider 302. The audio provider 302 may receive the one or more spoken utterances transmitted from the speech receiving device 101 and, upon or soon after receiving the one or more spoken utterances, feed the sound to a speech recognition processor 303. In one embodiment, the audio provider may be software capable of conditioning the audio signal.

The speech recognition engine 105 may also include a recognition controller 304. The recognition controller 304 may receive contextual information relating to a state in which the one or more spoken utterances transmitted from speech receiving device 117 is spoken. The recognition controller may receive contextual information from a number of sources including, but not limited to, a digital input sensing of the push-to-talk (PTT) dry switch or from an aircraft network bus interface for gathering engine RPM information. It should be understood that the recognition controller may receive contextual information through other non-limiting sources and the examples provided are merely illustrative.

Non-limiting examples of contextual information include a push-to-talk (PTT) state, time stamp, ambient noise, engine RPM, G-Force, flight phase, vehicle speed, vehicle mode, vehicle state, communication channel state, and a personality module. The recognition controller 304 may use one or more pieces of contextual information to customize the mode in which the speech recognition engine 105 processes the one or more spoken utterances according to the contextual information received.

In one embodiment, the speech recognition engine 105 may receive a number implementation rules for processing the spoken utterances according to the contextual information. Non-limiting examples of implementation rules may include acoustic models (e.g., American English, British English, Canadian English, etc), language models (e.g., French, English, Spanish, etc), phonetic dictionaries, grammars (e.g., phraseology), natural language rules (e.g., semantics), speech recognition engine tuning parameters (e.g., confidence threshold, pruning depth, etc.), configuration of the audio provider (e.g., additional filtering, gain control, noise filter, etc.), rules associated with the recognition controller (e.g., dynamic grammars, recognition start and stop time, etc.), and rules associated with post processing (e.g., word confidence, error handling, etc). The number of implementation rules may be received by the speech recognition processor 303. The speech recognition processor 303 may process the spoken utterances with the implementation rules to customize the mode in which the speech recognition engine 105 processes the one or more spoken utterances according to the contextual information.

The speech recognition engine may behave differently using one or more of the implementation rules based on the context information associated with the spoken utterance. For example, a command spoken by a speaker having an "American" accent will be received by the speech recognition engine 105 and, using a US acoustic model, the speech recognition processor 303 may process this utterance for recognition by a speech recognition device (not shown). In another example, a command spoken by a speaker having an "English" accent will be processed by the speech recognition engine 105 (through the speech recognition processor 303) using a UK acoustic model.

It should be understood that the use of implementation rules may not be mutually exclusive. For instance, the speech recognition processor 303 may also use, along with the US or UK acoustic model, the phonetic dictionary to distinguish between the pronunciation of words. For example, if a command includes the word "via," the speech recognition processor 303 may first determine the acoustic model to use (e.g., US or UK). The speech recognition processor may then refer to the phonetic dictionary for recognizing that a US speaker pronounces "via" as "vee-ya" or that a UK speaker pronounces the word as "vai-ya." It should also be understood that the order in which the implementation rules may be used can encompass a variety of combinations and arrangements.

In one embodiment, the speech recognition engine 105 may further include module 305. Module 305 may be in communication with the speech recognition processor 303 and, in one embodiment, may receive the processing results from speech recognition processor 303. Module 305 may further process the results of the speech recognition processor 303. In one embodiment, there may be implementation rules in the speech recognition processor 303 which may indicate the manner in which module 305 process the results of speech recognition processor 303. Accordingly, module 305 may further process the results according to one or more of the implementation rules associated with module 305. For example, the implementation rules for module 305 may include, but are not limited to, determining the "n-best" results for recognizing an utterance, word confidence, partial sub-recognition and error handling. Based on one or more of these implementation rules, module 305 may know, for example, to output the "n-best" result from the speech recognition processor 303 for output to a speech recognition device (not shown). It should be understood that the rules associated with module 305 are not mutually exclusive. In one embodiment, the speech recognition processor 303 may perform the post processing without module 305.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A speech recognition learning system for improved speech recognition comprising:
   a speech optimizing system configured to perform the following functions, not necessarily in the sequence listed:
   (A) receive a first stimulus data package including one or more spoken utterances comprising at least one phoneme transmitted from a speech receiving device and contextual information relating to a state in which the one or more utterances is spoken;
   (B) retrieve a plurality of first result data packages including a plurality of stored spoken utterances and stored contextual information associated with the plurality of stored spoken utterances relating to a state in which the utterance was spoken;
   (C) determine whether the first stimulus data package at least partially requires improvement, based on at least one of the plurality of retrieved first result data packages;
   (D) generate a second stimulus data package based on the determination of whether the first stimulus data package at least partially requires improvement, the second stimulus data package including contextual information relating to a state in which the one or more utterances is spoken, at least some of which contextual information is a of different type than the contextual information included in the first stimulus data package;
   (E) receive a plurality of first speech recognition implementation rules for implementing the second stimulus data package, the plurality of first speech recognition implementation rules being associated with the contextual information;
   (F) determine whether the second stimulus data package at least partially requires further improvement based at least in part on one or more of the plurality of first speech recognition implementation rules wherein the one or more of the plurality of first speech recognition implementation rules are based on the contextual information of the second stimulus data package; and
   (G) based on the determination, generate one or more second speech recognition implementation rules for improved speech recognition.

2. The speech recognition learning system of claim 1 wherein the system is further configured to perform functions (A) through (G) iteratively if the determination in function (F) does not produce an improved second stimulus data package.

3. The speech recognition learning system of claim 1 further comprising a live speech recognition system in communication with the speech optimizing system, the live speech recognition system being configured to:
   (A) receive one or more spoken utterances uttered within range of a speech receiving device and contextual information relating to a state in which the one or more utterances is spoken;
   (B) receive a plurality of live speech recognition implementation rules;
   (C) based on at least one of the plurality of live speech recognition implementation rules, output speech for recognition by a voice activated device capable of recognizing the outputted speech, the at least one of the plurality of live speech recognition implementation rules being based on the contextual information associated with the one or more spoken utterances.

4. The speech recognition learning system of claim 1 wherein the speech optimizing system is further configured to:
(H) generate one or more second result data packages including at least one of the plurality of first speech recognition implementation rules;
(I) receive the one or more second result data packages by one or more knowledge databases including a plurality of stored first result data packages;
(J) select at least one first speech recognition implementation rule from the one or more second result data packages for providing improved speech recognition, wherein the at least one of the plurality of first speech recognition implementation rules is selected based upon a pattern between at least two of a plurality of stored result data packages in the one or more knowledge databases;
(K) transmit the selected first speech recognition implementation rule in order to optimize the first speech recognition implementation rule for improved speech recognition; and
(L) generate one or more second speech recognition implementation rules that are optimized for use during a speech recognition event.

5. The speech recognition learning system of claim 4 wherein the speech optimizing system is further configured to perform functions (H)-(L) iteratively.

6. The speech recognition learning system of claim 4 wherein, based on the determination in function (F), the system is further configured to generate one or more hypotheses, and the one or more second result data packages generated in function (H) are based on the one or more hypotheses.

7. A speech optimizing system comprising:
(I) a stimulus data package receiver for receiving a first stimulus data package including one or more spoken utterances comprising at least one phoneme transmitted from a speech receiving device and contextual information relating to a state in which the one or more utterances is spoken;
(II) a result data package retriever for retrieving a plurality of first result data packages including a plurality of stored spoken utterances and stored contextual information associated with the plurality of stored spoken utterances relating to a state in which the utterance was spoken;
(III) at least one stimulus data package generator for:
determining whether the first stimulus data package at least partially requires improvement, based on at least one of the plurality of retrieved first result data packages; and
generating a second stimulus data package based on the determination of whether the first stimulus data package at least partially requires improvement, the second stimulus data package including contextual information relating to a state in which the one or more utterances is spoken, at least some of which contextual information is a of different type than the contextual information included in the first stimulus data package;
(IV) at least one speech improvement processor for:
receiving a plurality of first speech recognition implementation rules for implementing the second stimulus data package, the plurality of first speech recognition implementation rules being associated with the contextual information; and
determining whether the second stimulus data package at least partially requires further improvement based at least in part on one or more of the plurality of first speech recognition implementation rules, wherein the one or more of the plurality of first speech recognition implementation rules are based on the contextual information of the second stimulus data package; and
(V) an implementation rules generator for generating, based on the determination from the speech improvement processor, one or more second speech recognition implementation rules for improved speech recognition.

8. The speech optimizing system of claim 7 wherein system component (III) comprises:
a first stimulus data package generator for determining whether the first stimulus data package at least partially requires improvement, based on at least one of the plurality of retrieved first result data packages; and
a second stimulus data package generator for generating a second stimulus data package based on the determination of whether the first stimulus data package at least partially requires improvement.

9. The speech optimizing system of claim 7 wherein system component (IV) comprises:
a first speech improvement processor for receiving a plurality of first speech recognition implementation rules for implementing the second stimulus data package; and
a second speech improvement processor for determining whether the second stimulus data package at least partially requires further improvement based at least in part on one or more of the plurality of first speech recognition implementation rules.

10. The speech optimizing system of claim 7 further comprising:
(VI) a baseline handler for generating a plurality of initial speech recognition implementation rules wherein the plurality of initial speech recognition implementation rules are used, at least in part, in determining whether the second stimulus data package requires further improvement.

11. The speech optimizing system of claim 7 wherein system component (III) further comprises:
a contextual information generator for applying a plurality of contextual scenarios to the first stimulus data package to gauge the effect of at least one of the plurality of contextual scenarios on the first stimulus data package with respect to speech recognition; and
a stimulus generator for generating the second stimulus data package based on at least one of the plurality of contextual scenarios.

12. The speech optimizing system of claim 7 further comprising a live speech recognition system in communication with the speech optimizing system, the live speech recognition system comprising:
(I) a receiver for receiving one or more spoken utterances uttered within range of a speech receiving device and contextual information relating to a state in which the one or more utterances is spoken;
(II) a receiver for receiving a plurality of live speech recognition implementation rules;
(III) a processor for processing the one or more spoken utterances and contextual information with one or more of the plurality of live speech recognition implementation rules, the one or more of the plurality of live speech recognition implementation rules being based on the contextual information associated with the spoken utterance; and (IV) a transmitter for outputting one or more processed spoken utterances for recognition by a speech activated device capable of recognizing the outputted speech.

13. The speech optimizing system of claim 7 further comprising:
(VI) one or more knowledge databases including a plurality of stored first result data packages comprising at least one of the plurality of first speech recognition implementation rules, the one or more knowledge databases in communication with the speech optimizing system for receiving one or more second result data packages;
(VII) a knowledge prospector for:
selecting at least one first speech recognition implementation rule from the one or more second result data packages for providing improved speech recognition, wherein the at least one first speech recognition implementation rule is selected based upon a pattern between at least two of a plurality of stored result data packages in the one or more knowledge databases; and
transmitting the selected first speech recognition implementation rule in order to optimize the first speech recognition implementation rule for improved speech recognition; and
(VIII) an implementation rules generator for generating one or more second speech recognition implementation rules that are optimized for use during a speech recognition event.

14. A speech recognition learning system for improved speech recognition comprising:
(a) means for receiving a first stimulus data package including one or more spoken utterances comprising at least one phoneme transmitted from a speech receiving device and contextual information relating to a state in which the one or more utterances is spoken;
(b) means for retrieving a plurality of first result data packages including a plurality of stored spoken utterances and stored contextual information associated with the plurality of stored spoken utterances relating to a state in which the utterance was spoken;
(c) means for determining whether the first stimulus data package at least partially requires improvement, based on at least one of the plurality of retrieved first result data packages;
(d) means for generating a second stimulus data package based on the determination of whether the first stimulus data package at least partially requires improvement, the second stimulus data package including contextual information relating to a state in which the one or more utterances is spoken, at least some of which contextual information is a of different type than the contextual information included in the first stimulus data package;
(e) means for receiving a plurality of first speech recognition implementation rules for implementing the second stimulus data package, the plurality of first speech recognition implementation rules being associated with the contextual information;
(f) means for determining whether the second stimulus data package at least partially requires further improvement based at least in part on one or more of the plurality of first speech recognition implementation rules wherein the one or more of the plurality of first speech recognition implementation rules are based on the contextual information of the second stimulus data package; and
(g) based on the determination, means for generating one or more second speech recognition implementation rules for improved speech recognition.

15. The speech recognition learning system of claim 14 further comprising means for performing the functions of (a) through (g) iteratively if the means for performing function (f) does not produce an improved second stimulus data package.

16. The speech recognition learning system of claim 14 further comprising:
(h) means for receiving one or more spoken utterances uttered within range of a speech receiving device and contextual information relating to a state in which the one or more utterances is spoken;
(i) means for receiving a plurality of live speech recognition implementation rules; and
(j) based on at least one of the plurality of live speech recognition implementation rules, means for outputting speech for recognition by a speech activated device capable of recognizing the outputted speech, the at least one of the plurality of live speech recognition implementation rules being based on the contextual information associated with the one or more spoken utterances.

17. The speech recognition learning system of claim 14 further comprising:
(k) means for generating one or more second result data packages including at least one of the plurality of first speech recognition implementation rules;
(l) means for receiving the one or more second result data packages by one or more knowledge databases including a plurality of stored first result data packages;
(m) means for selecting at least one first speech recognition implementation rule from the one or more second result data packages for providing improved speech recognition, wherein the at least one first speech recognition implementation rule is selected based upon a pattern between at least two of a plurality of stored result data packages in the one or more knowledge databases;
(n) means for transmitting the selected first speech recognition implementation rule in order to optimize the first speech recognition implementation rule for improved speech recognition; and
(o) means for generating one or more second speech recognition implementation rules that are optimized for use during a speech recognition event.

18. The speech recognition learning system of claim 17 further comprising means for performing the functions of (k)-(o) iteratively.

19. The speech recognition learning system of claim 17 wherein based on the determination in function (f), the system further includes a means for generating one or more hypotheses; and
wherein the one or more second result data packages generated are based on the one or more hypotheses.

20. A computer-implemented speech recognition learning method for improved speech recognition, the method comprising the following steps, not necessarily practiced in the sequence listed:
(1) transmitting one or more utterances comprising at least one phoneme at a speech receiving device;
(2) receiving a first stimulus data package including one or more spoken utterances comprising at least one phoneme transmitted from a speech receiving device and contextual information relating to a state in which the one or more utterances is spoken;
(3) retrieving a plurality of first result data packages including a plurality of stored spoken utterances and stored contextual information associated with the plurality of stored spoken utterances relating to a state in which the utterance was spoken;

(4) determining whether the first stimulus data package at least partially requires improvement, based on at least one of the plurality of retrieved first result data packages;

(5) generating a second stimulus data package based on the determination of whether the first stimulus data package at least partially requires improvement, the second stimulus data package including contextual information relating to a state in which the one or more utterances is spoken, at least some of which contextual information is a of different type than the contextual information included in the first stimulus data package;

(6) receiving a plurality of first speech recognition implementation rules for implementing the second stimulus data package, the plurality of first speech recognition implementation rules being associated with the contextual information;

(7) determining whether the second stimulus data package at least partially requires further improvement based at least in part on one or more of the plurality of first speech recognition implementation rules wherein the one or more of the plurality of first speech recognition implementation rules are based on the contextual information of the second stimulus data package; and (8) based on the determination, generating one or more second speech recognition implementation rules for improved speech recognition.

21. The computer-implemented speech recognition learning method of claim 20 further comprising performing steps (2) through (8) iteratively if the determination in step (7) does not produce an improved second stimulus data package.

22. The computer-implemented speech recognition learning method of claim 20 further comprising:

(9) receiving one or more spoken utterances uttered within range of a speech receiving device and contextual information relating to a state in which the one or more utterance is spoken;

(10) receiving a plurality of live speech recognition implementation rules; and

(11) based on at least one of the plurality of live speech recognition implementation rules, outputting speech for recognition by a speech activated device capable of recognizing the outputted speech, the at least one of the plurality of live speech recognition implementation rules being based on the contextual information associated with the one or more spoken utterances.

23. The computer-implemented speech recognition learning method of claim 20 further comprising:

(12) generating one or more second result data packages including at least one of the plurality of first speech recognition implementation rules;

(13) receiving the one or more second result data packages by one or more knowledge databases including a plurality of stored first result data packages;

(14) selecting at least one first speech recognition implementation rule from the one or more second result data packages for providing improved speech recognition, wherein the at least one first speech recognition implementation rule is selected based upon a pattern between at least two of a plurality of stored result data packages in the one or more knowledge databases;

(15) transmitting the selected first speech recognition implementation rule in order to optimize the first speech recognition implementation rule for improved speech recognition; and

(16) generating one or more second speech recognition implementation rules that are optimized for use during a speech recognition event.

24. The computer-implemented speech recognition learning method of claim 23 further comprising performing steps (12)-(16) iteratively.

25. The computer-implemented speech recognition learning method of claim 23 wherein based on the determination in step (7), the method further comprises generating one or more hypotheses wherein the one or more second result data packages generated are based on the one or more hypotheses.

\* \* \* \* \*